April 21, 1970 W. E. WILBURN 3,507,638
METHOD AND APPARATUS FOR CENTRIFUGALLY CASTING
AND TRIMMING GLASS WARE
Filed April 7, 1967

INVENTOR.
WARREN E. WILBURN
BY
E.J. Holler &
W.A. Schaich
ATTORNEYS

United States Patent Office 3,507,638
Patented Apr. 21, 1970

3,507,638
METHOD AND APPARATUS FOR CENTRIF-
UGALLY CASTING AND TRIMMING GLASS
WARE
Warren E. Wilburn, Columbus, Ohio, assignor to Owens-
Illinois, Inc., a corporation of Ohio
Filed Apr. 7, 1967, Ser. No. 629,222
Int. Cl. C03b 9/46
U.S. Cl. 65—70                                    5 Claims

ABSTRACT OF THE DISCLOSURE

A glassworking tool for scoring a workable glass surface such as, for example, a newly-formed cathode-ray tube funnel, the tool comprising a generally disc-shaped member having its peripheral edge beveled to form dissimilar juxtaposed angles, one of these angles being about 2½° and the other being substantially larger.

Background of invention

This invention relates to the art of glass-severing; more particularly, it relates to annularly grooving a hollow glass article as a preliminary step in the process of removing a moil portion by scoring to assist the development of thermally-induced stresses.

Briefly stated, one method of producing hollow, generally frusto-conical shaped glass articles, such as television picture tube envelopes, consists of forming a funnel member and subsequently sealing a face-plate thereto. Generally, the funnel member is formed by introducing a charge of molten glass into an open-topped vertically aligned mold and rotating the mold at high speed, whereby the glass climbs upwardly on the internal mold surfaces to produce the required shape. However, the funnel member, produced by this technique, does not have a sufficiently plane outer rim surface to allow proper face plate sealing; consequently, supplemental manufacturing methods have been devised to produce the desired planeness of the outer rim surface.

Typically, these supplemental methods include the steps of creating a circumferential scored groove in the interior surface of the hollow glass article and subsequently, by thermally induced stresses, allowing the moil portion to separate from the body portion of the article; the upper rim or edge of the body portion then being ground to produce the sealable flat seal edge surface. U.S. Patents 2,662,289, 2,629,206 and 2,840,952 disclose methods and apparatus for accomplishing the grooving of the interior surface by use of beveled rollers, or discs, the latter being directed to both grooving and scoring of the glass sidewall. These grooving discs, which are beveled to produce equi-angular juxtaposed angles at their peripheral edge, have been found deficient in certain respects. First of all, the upper edge surface of the body portion of a glass article severed by these techniques has a substantial angle relative to the body axis, thereby requiring appreciable grinding to produce the required sealing surface. Secondly, there is a notable occurrence of checks in proximity to the groove produced by the equiangular prior art grooving discs.

Summary of the invention

In accordance with this invention, an improvement in methods and apparatus for grooving, scoring and severing workable glass is provided, whereby the required grinding to produce a flat sealing surface is substantially minimized.

More particularly, in accordance with this invention a scoring disc having a sharply-pointed beveled edge including dissimilar juxtaposed angles is provided, the use of which produces a substantially defect-free surface which, upon separation of a body portion and moil portion, resides substantially normal to the article axis.

Brief description of the drawings

The foregoing, and other advantageous features of this invention will become apparent upon reference to the drawings, of which.

Description of preferred embodiments(s)

Figure 3:
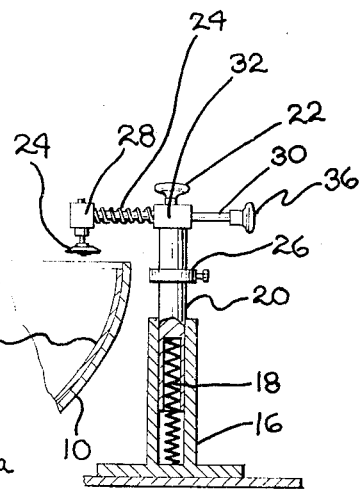
FIGURE 3 is a fragmentary view showing a newly formed glass article and an apparatus for grooving the interior surface of the hollow article while the glass is in a workable state.

Referring to the drawings, FIGURE 3 shows a mold 10 in which the glass funnel member 12 of a color television picture tube envelope has been newly formed. While not shown in the drawings, the method of forming these and similar types of hollow glass articles comprises introducing a charge of molten glass into a mold and rotating the mold at high speed, whereby the centrifugal force causes the glass to spread over the internal mold surface and conform to the desired shape; additionally, a pressing operation may be combined with the rotation method in accordance with techniques well known in the art. Subsequent to the forming of articles as generally described above, it is necessary that the upper peripheral margin be further processed to produce an outer rim edge surface which is generally normal to the article axis, thereby facilitating the sealing of a faceplate thereto. Generally, this additional processing may be accomplished by use of a grooving and scoring device, as shown in FIGURE 3, followed by the separation of the article into a body portion and moil portion and finally, grinding the upper rim edge of the body or funnel member to produce the desired flatness of the seal edge surface.

The scoring device comprises a supporting member 14 for a bored cylinder 16 containing an internally positioned coil spring 18. Inserted within the cylinder bore, and elastically supported upon the spring 18, is a piston 20, the upper margin being formed into a knob 22 which may be engaged to compress the spring 18 and thereby position a grooving and scoring disc 24 at the level at which the removal of a moil portion of the funnel member 12 is to be accomplished. The extent to which the disc 24 is lowered may be controlled by a collar 26 provided on the piston 20 and adjustable to engage the upper surface of the cylinder 16. Scoring disc 24 is rotatably mounted in a suitable bearing assembly 28 on one end of a rod 30; the rod being slidable in a horizontal bearing 32 integrally formed with the piston 20. Positioned on the rod 30 and disposed intermediate the bearings, 28 and 32 respectively, is a spring 34 which allows the disc 24 to be brought into releasable contact with the molded funnel member 12. By means of a handle 36, the disc may be held with a yielding pressure against the funnel surface to be grooved and scored while relative rotation of the molded funnel 12 and disc 24 is provided by suitable means (not shown), the funnel thereby being formed with an internal, annular re-entrant recess. The relative rotation of grooving disc and funnel is continued for preferably two or more revolutions to effect scoring of the root of the groove for improved moil separation. Severance of the moil portion is effectuated by allowing thermally-induced stresses to develop during cooling of the article. While the foregoing speaks with reference to a single grooving disc, it will be apparent to those skilled in the art that multiple discs in tandem alignment may also be used in an apparatus such as disclosed by U.S. Patent No. 2,840,952.

As hereinbefore mentioned, the prior art discs have been found deficient in that upon separation of the moil and body portion, glass defects, for example checks or microchecks, frequently occur upon the latter. Unexpectedly, it has been found that, by altering the configuration of the prior art discs, the occurrence of defects can be substantially minimized; moreover, as will be subsequently seen, the altered configuration results in more economical operation by reducing subsequently required after-processing, such as grinding.

Figure 2:
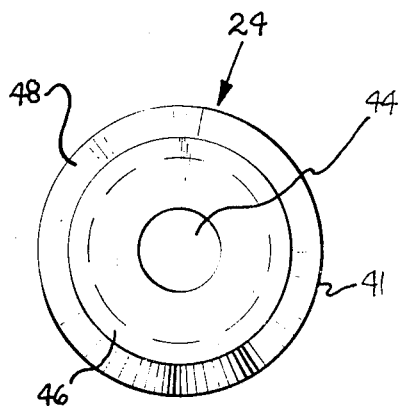
FIGURE 2 is a plan view of the scoring tool.
Figure 1:
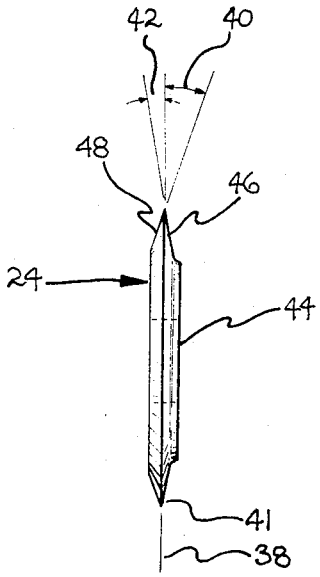
FIGURE 1 is a side elevational view of the scoring tool of this invention.

The conventional scoring disc of the prior art consists of a metallic wheel which has its periphery beveled to produce a relatively blunt edge having an included angle of about thirty degrees; this included angle being defined by two equal, juxtaposed angles of 15°. Referring to FIGURES 1 and 2, it can be seen that the improved disc 24 has a beveled edge 41 comprised of dissimilar angles 40 and 42 on juxtaposed sides, 48 and 46 respectively. Additionally, the disc is provided with a suitable aperture 44 to allow for freely rotatable mounting as generally described in conjunction with FIGURE 3. It has been found that a preferred relationship of the dissimilar angles exists, if one is to fully realize the advantages priorly noted. In the preferred embodiment the apertured scoring disc 24 comprises a generally flat circular wheel having its beveled edge 42 defining an included angle of approximately twenty degrees. Moreover, it is preferred that one side 46 make an angle 42 with the planar axis 38 of the disc which is substantially smaller than the angle 40 defined by the other side 48. In employing the improved disc, it has been found most satisfactory that the smaller angled side 46 have a substantially greater radial dimension than the corresponding side 48 of the larger angle 40 and that the angles be about 2½ and 17½ degrees respectively. When mounting the scoring disc 24 in a suitable scoring device, it is important that the side 46 defining the smaller angle 42 be adapted to contact the funnel body portion as opposed to the moil portion which will be discarded.

Thus, after a hollow glass article 12 has been formed within a complemental mold 10 by rotation of said mold, or combined pressing and rotation, and while the glass is in a workable condition, the scoring disc 24 is introduced into the open end of the mold, and brought into grooving relation with the interior surface of the article. It is highly desirable that the disc side contacting the body portion make a small angle with the disc planar axis to prevent shaving of cold glass during scoring of the groove, i.e. subsequent to the initial grooving revolution. As a result of the relative rotation of the disc and article, an internal line of separation is provided on the article in the form of an annular, re-entrant recess; the surface of the recess, adjacent the article body, being substantially normal to the article axis. Subsequently, the article may be thermally severed by so-called "ringing-off," a method well known in the arts. In the case of tandem scoring discs (see for example U.S. Patent No. 2,840,952), wherein a blunt disc leads a trailing, sharper disc for scoring, it has been found that maximum benefit of this invention, i.e. decrease in glass defects and reduced grinding, is obtained by substituting a pair of similar discs each having the above-described configuration.

Figure 4:
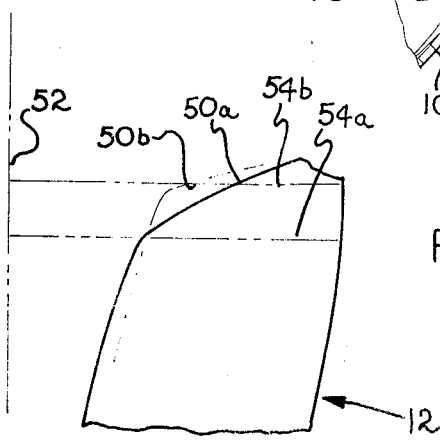
FIGURE 4 is a fragmentary sectional view showing the wall of a cathode-ray tube funnel which has been grooved, scored and subsequently severed from a moil portion by means of thermal stresses.

FIGURE 4 shows an enlarged fragment of the upper seal edge of a funnel body portion 12 after the moil (not shown) has been removed. For purposes of comparison, the seal edge resulting from the scoring by means of prior art discs is represented in solid lines, while that produced with the improved disc of this invention is shown by dotted lines. It will be noted that the upper surface 50a of the funnel body portion 12 has a substantial angular orientation relative to the funnel axis 52. Consequently, in order to produce a seal edge 54a which is planar and generally normal to the funnel axis, appreciable grinding is required. In contrast however, the upper surface 50b, resulting from the use of the scoring disc of this invention, is substantially normal to the article axis and therefore requires much less grinding to produce the flat seal edge 54b.

From the foregoing, it will be apparent that, in a preferred embodiment, the scoring wheel of this invention has a beveled edge with an included angle of about 20 degrees, the included angle being defined by dissimilar angles on juxtaposed sides. Additionally, the side of the disc contacting the article body portion is preferably provided with a small, shallow angle which, as opposed to a planar surface, prevents cold glass from being shaved from the article upon tracking of the scoring wheel in the antecedently formed groove.

While a specific embodiment of this invention has been described in detail above, it will be apparent to those skilled in the art that the embodiment may be modified. Consequently, the foregoing is to be considered exemplary, rather than limiting and the true scope of the invention is as described in the following claims.

I claim:
1. A glassworking tool for scoring the workable interior surface of a newly-formed hollow glass article such as the funnel member of a cathode-ray tube envelope or the like for subsequent separation of a moil portion from the body portion along a score line, said tool comprising a flat metallic circular wheel member having a beveled edge with an included angle of about 20° and dissimilar angles on juxtaposed sides, one side of said beveled edge having a substantially smaller angle than the other side said smaller angle being about 2½° with respect to the planar axis of said wheel, the smaller angle side adapted to contact the article body portion to provide a substantially flatter and defect-free surface upon thermal separation of the body and moil portions of said article.

2. A glassworking tool in accordance with claim 1, wherein the body-contacting side of said beveled edge makes an angle of about 2½° and the moil portion side makes an angle of about 17½° with respect to the planar axis of said wheel.

3. A glassworking tool in accordance with claim 2, wherein said beveled edge has a substantially greater radial dimension on the smaller angle side than on the larger angle side.

4. In a method of forming from a molten glass charge a hollow frusto-conical shaped glass article, such as a funnel member of a cathode-ray picture tube envelope or the like, including the steps;
  (a) forming said hollow glass article within a complimental mold by combined pressing within and rotation of said mold to centrifugally cast the molten glass charge,
  (b) forming a reentrant annular V-shaped recess on said article by contacting the interior surface of said article while in a newly formed, workable condition within said mold with at least one beveled scoring disk,
  (c) removing the article from said mold and thermally severing said article along said annular recess into a body portion and waste portion, and
  (d) grinding the body portion to produce a sealable flat seal edge,
the improvement comprising minimizing the grinding and reducing the occurrence of checks on said body portion by contacting the article in step (b) with a scoring disk having an annular beveled edge with an included angle of about 20° and dissimilar angles on juxtaposed merging sides, the body portion contacting side of said beveled edge making an angle of about two and one-half degrees with respect to the planar axis of said disk and the waste portion contacting side making an angle of about seventeen and one-half degrees with respect to the planar axis of said disk and said body portion contacting side having a substantially greater radial dimension than the waste portion contacting side.

5. In an apparatus for grooving and scoring a hollow freshly formed glass article while the glass is still in a workable condition, to form an article having thermally severable body portions and moil portions, said apparatus including at least one rotatably mounted disk, means for bringing said disk into grooving relation with the interior surface of said freshly formed article, and means for relative rotation of said freshly formed article and disk, the improvement wherein said disk includes a beveled peripheral edge having an included angle of about 20° defined by dissimilar angles on juxtaposed merging sides, the body portion contacting side of said beveled edge making an angle of about two and one-half degrees with respect to the planar axis of said disk and the moil portion contacting side of said beveled edge making an angle of about seventeen and one-half degrees with respect to the planar axis of said disk, whereby a substantially flatter, defect-free surface results upon the separation of the body and moil portions.

References Cited

UNITED STATES PATENTS

| | | | |
|---|---|---|---|
| 1,914,205 | 6/1933 | Hooper et al. | 65—105 X |
| 2,629,206 | 2/1953 | Giffen et al. | 65—70 |

ARTHUR D. KELLOGG, Primary Examiner

U.S. Cl. X.R.

65—177; 83—676